United States Patent Office 2,841,623
Patented July 1, 1958

2,841,623

PROCESS FOR THE ALKYLATION OF PHENOLS

Douglas G. Norton and Rupert C. Morris, Berkeley, Calif., assignors to Shell Development Company, New York, N. Y., a corporation of Delaware No Drawing. Application May 8, 1957
Serial No. 657,715

16 Claims. (Cl. 260—624)

This invention relates to a novel process for the alkylation of phenols.

It is known that phenols may be nuclearly alkylated by reaction with olefins in the presence of various catalysts such as sulfuric acid. Not only may phenol be alkylated but alkylated phenols may be further alkylated in other positions. A typical and common alkylation is afforded by the preparation of 2,6-di-tert-butyl p-cresol which may be prepared by the reaction of para-cresol and isobutylene in the presence of sulfuric acid. Such prior art processes are suitable and have been employed for many years in order to obtain commercially useful products. They have, however, certain disadvantages which this invention overcomes. One such disadvantage is that the supply of starting materials, as para-cresol, is sometimes limited. Thus, the production of chemicals from such compounds as para-cresol is not reliable. Another disadvantage of the prior art processes is that considerable waste results due to the sulfonation of the phenol which may amount to as much as 5%, and even higher. Additional waste occurs due to the production of products of polymerization. It will be readily apparent that prior art processes which employ reagents as sulfuric acid are more costly as specialized equipment is required and replacement of apparatus is more frequent because of corrosion. Other processes for the preparation of alkylated phenols, which do not employ the same reactants or methods, have other disadvantages such as the production of mixed products thereby requiring additional processing steps in order to separate and purify the desired product. In other instances prior art processes may be characterized by low yields and/or high processing costs. Disadvantages of the type described, and other disadvantages in this art, have now been eliminated by the processes of this invention.

It is an object of this invention to provide a novel improved process for the nuclear alkylation of phenols. It it another object of this invention to provide a process for the nuclear alkylation of phenols having hydrogen bonded to the aromatic ring in at least one of the ortho- and para-positions to the phenolic hydroxyl group. It is yet another object of this invention to provide for the nuclear methylation of phenols and particularly for the para-methylation of 2,6-dialkyl phenols. Other objects will become apparent as the description proceeds.

These and other objects are accomplished by the process for the nuclear alkylation of a phenol having hydrogen bonded to the aromatic ring in at least one of the position ortho- and para-positions to the phenolic hydroxyl group which comprises heating together said phenol with an aldehyde at temperatures above about 150° C. and below a temperature at which substantial decomposition occurs, said reaction being conducted in the presence of a basic-acting material and an added primary alcohol.

After the reactants and reagents are charged to a suitable reaction vessel, the temperature is raised to above about 150° C., but below the temperature at which substantial decomposition occurs. At such temperatures some of the reactants will vaporize. Accordingly, the process of the present invention is conducted in a suitable pressure vessel whereby the reaction is conducted in the liquid phase at elevated pressures. The several reactants and reagents may be charged to the vessel in any order and in any suitable form. Thus, for example, the basic-acting material may be a free base or it may be in solution with water or in the form of an alcoholate. After the reaction has been conducted for a period of time sufficient to obtain the maximum yield, the reaction product is separated from the reaction vessel and treated to separate the product from by-products. The separation may be accomplished by any suitable means with the most preferred procedure being by selective extraction.

The process of this invention has general application for the alkylation of phenols of the type described above and the specific final product produced will depend upon the alcohol and the aldehyde because they participate in the reaction to the extent that their hydrocarbon nuclei become attached to the aromatic ring.

In order to fully understand the scope of the inventive process of this invention it is desirable to describe reaction mechanisms which may occur but it should be understood that this invention is in no way dependent upon theoretical considerations and the explanation of a reaction mechanism is offered to assist those skilled in the art to a better understanding of the invention and possibly lead them to further advances in the chemical arts. For the sake of simplicity, the mechanism will be described as it relates to a preferred starting material such as a 2,6-di-alkyl phenol, represented by the formula

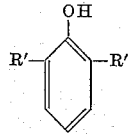

wherein R' is alkyl.

It is believed that the mechanisms of this invention involve the possible formation of some transient, unstable products or products which are so reactive under the conditions of the reaction that all of them cannot be isolated from the reaction mixtures. This may be represented by the following equations wherein the starting phenol is reacted with aldehyde and/or alcohol:

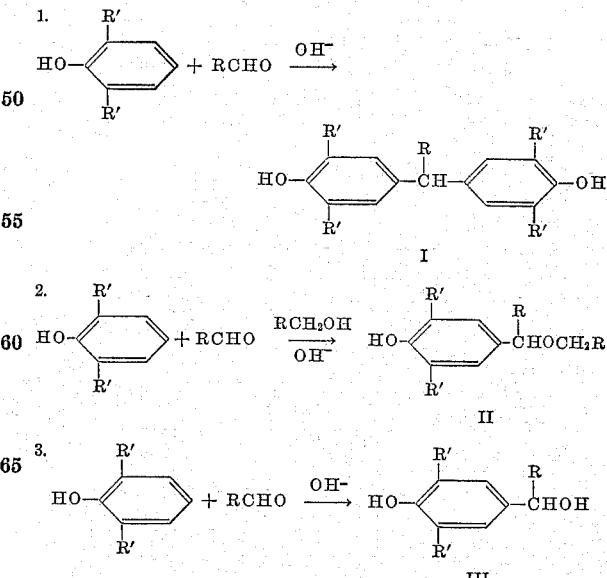

Products of the type shown by Formula I may sometimes be isolated in small amounts as a by-product during the present process. The existence and formation of compounds II and III, prepared by Equations 2 and 3 respectively, is not known to take place for certain but it is known that they can take place under much milder reaction conditions. The extent to which compounds II and III are formed, if they are formed, is not known nor is it known for certain whether the sole reaction at this stage is that of Equations 1, 2 or 3. However, based on the prior knowledge it is reasonable to assume that compounds I, II and III are formed with the last two being totally transient or unstable under the conditions of the reaction.

Following the formation of compounds I, II and III it is believed that some of them or, more likely, all of them react according to the following equations:

4.
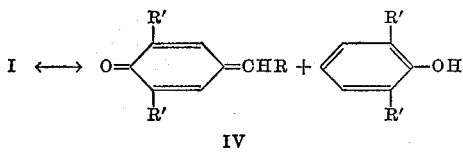

5. 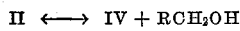

6. 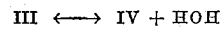

Compound IV may be generically termed a "quinone methide." It is believed that the quinone methide is an unstable intermediate which is reduced to produce the alkylated product. The reduction probably is accomplished with hydrogen but the mechanism whereby the hydrogen is supplied is not known for certain. Several possible mechanisms are suggested. Hydrogen may be afforded from the alcohol according to the following equation:

7. $RCH_2OH \rightarrow RCHO + H_2$

If such is the case then the alcohol serves a dual function in that it is a source of hydrogen on the one hand and on the other hand its hydrocarbon alkyl radical serves to alkylate the phenol. The quinone methide may possibly be reduced by the aldehyde. Present evidence indicates that there probably is some kind of an interaction among the aldehyde, alcohol and basic-acting material whereby reduction takes place. Theoretically, the reduction may be presented by the following equations:

8.
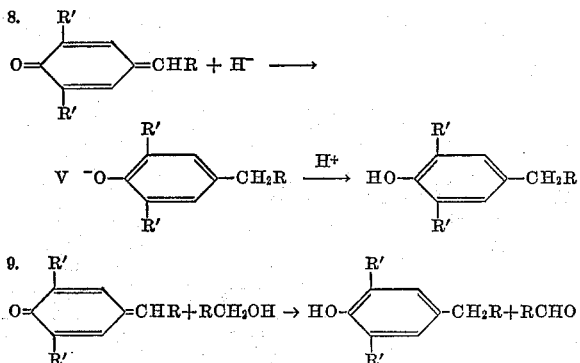

9.
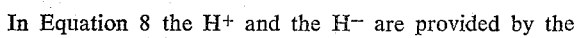

In Equation 8 the H+ and the H− are provided by the reductant, which is present throughout the reaction. It will be found that other reductants may be employed such as hydroquinone, hydrosulfite and the like. Reduction may also be accomplished by hydrogen with a hydrogenation-dehydrogenation catalyst. When other reductants are employed it will be found that the yields are lower and the conditions of reaction become considerably more complex. In practice, it will be found that a substantial disadvantage results if the aldehyde and alcohol are not present initially at the time of the reaction and that no substantial advantage is obtained by the use of reductants such as hydroquinone, hydrosulfite, hydrogen and the like.

In view of the above-described reaction mechanisms it will be readily appreciated that there is more than one possible means by which the quinone methide is produced followed by reduction and at present it cannot be said which mechanism is the one which actually occurs during the present process. It may be stated, however, that the present invention is a practical process for the production of alkylated phenols only when the starting phenol is reacted in the presence of an aldehyde, an alcohol and a basic acting material.

The starting phenolic material may be any of several types. It may be phenol in which case the final product will be a mixture comprising ortho- and para-alkylates. The starting phenolic materials may also be an alkylated phenol which has hydrogen bonded to at least one of the ortho- and/or para-positions. The phenol may also be a 2,6-di-alkyl phenol. In the preferred embodiment the latter type of starting material is preferred because the process of this invention then affords alkylated phenols which are known to be most useful as anti-oxidants such as 2,6-di-tert-butyl para-cresol. It will be understood, however, that the processes of this invention are not limited to the preferred embodiment as other alkylated phenols are useful anti-oxidants and as chemical intermediates. Other suitable starting materials include p-cresol, m-cresol, 2,6-xylenol, 2,4-xylenol, 2,6-diisopropyl phenol, p-isopropyl phenol, 2,4-di-tert-butyl phenol, and the like.

The aldehyde, which is a reactant in the processes of this invention, may be any saturated aldehyde of the formula RCHO wherein R is hydrogen or alkyl. The aldehyde is one of the reactants which determines the nature of the alkyl group which is substituted on the phenolic nucleus. Thus, for example, with formaldehyde the phenol will be methylated; with acetaldehyde the phenol will be ethylated, with propionaldehyde the phenol will be propylated, and so on. As alkylated phenols which have nuclear methylation in the para-position are particularly preferred as anti-oxidants, the preferred embodiments of this invention require that formaldehyde be used but, as indicated above, this invention is not limited to the preferred embodiment as other alkylated phenols, which are also useful as anti-oxidants, may be prepared by the processes of this invention using other aldehydes. It is an outstanding advantage of this invention that the methylated products are obtained most easily and in the highest yields when the aldehyde is formaldehyde. It will be found that as the number of carbon atoms of the aldehyde increase the process affords lower yields. Accordingly, aldehydes having up to 8 carbon atoms are preferred while aldehydes having from 1 to 3 carbon atoms are particularly preferred.

As previously stated, the processes of this invention require that the reaction be conducted in the presence of an aldehyde and added alcohol. By this means several important processing advantages are obtained. One important advantage is that the temperature required for the reaction to take place is relatively low whereas higher temperatures are required if the alcohol is the sole alkylating agent. Apart from cost considerations, the higher temperature is not desirable because some dealkylation may occur in which case lower yields of the desired product are obtained and mixed products result. Further, as the higher temperatures may produce mixed products subsequent separation and purification steps become important whereas the use of lower temperatures considerably simplify the purification steps. Another important advantage accrues in that reaction times are substantially shorter. Yet another important advantage results because the quantity of the aldehyde which is required is small although excesses may be be employed. However, the employment of excesses of aldehyde serve no useful purpose as the alcohol is the principal alkylating agent.

The process of the invention is employed with greatest advantage when the alcohol corresponds to the aldehyde which is employed. Thus, with formaldehyde, methanol is employed; with acetaldehyde, ethanol is employed, and so on. In this way the alkylated phenolic products are homogeneous. As in the case of the aldehydes, the preferred embodiments of the invention employ primary alcohols having up to 8 carbon atoms while alcohols having 1 to 3 carbon atoms are particularly preferred. If the alcohol has more than 8 carbon atoms the process becomes more complex and the use of inert solvents may be necessary.

The process of the invention may also be conducted by initiating the reaction with the phenol, alcohol and base present in the reaction mixture, and by forming the aldehyde from the alcohol in situ. By use of a copper catalyst in the reaction solution, only the methanol need be present at the inception of the reaction, since in this way enough of the alcohol is converted to formaldehyde for the alkylation reaction of the invention to take place.

As previously indicated, the processes of this invention are conducted in the presence of a base. Any base or basic acting reagent is found to be suitable for the processes of this invention. Among such reagents there may be mentioned for example, hydroxides of alkali metals and alkali earth metals, ammonia and amines including primary, secondary or tertiary amines, quaternary ammonium salts, quaternary ammonium bases and the like. In addition to such bases, oxides and carbonates of alkali earth metals and alkali metals may also be used. Such bases include calcium carbonate, sodium carbonate, calcium oxide, potassium carbonate and the like. In the preferred embodiment of this invention the base is most advantageously selected from those that may be characterized as the strong type, particularly the hydroxides of alkali metals and tertiary amines. The strong base affords the advantage that the reaction proceeds more rapidly and gives higher yields. On the other hand, weak bases require more vigorous reaction conditions in order to obtain satisfactory results. In considering the choice among the strong bases an important consideration will be that of cost and accordingly alkali metal hydroxides are presently preferred. If an organic base is to be used, the greatest advantage is obtained from such bases which are of low molecular weight as ethylamine, diethylamine, ethylene diamine, and the like as such materials will participate in the reaction more readily.

At present, the function of the basic-acting material is not fully understood. It will appear hereinafter that as the amount of the base is decreased the yield of the desired product is decreased. If the basic-acting material is not present the process of this invention becomes inoperative.

The process of this invention is conducted at temperatures above about 150° C. but below temperatures at which substantial decomposition occurs. In the preferred embodiment the temperatures range from about 175 to about 350° C. with temperatures from about 200° C. to about 275° C. being particularly preferred. At temperatures from about 150 to about 175° C. it will be found that longer reaction times are required in order to obtain substantial conversion of the starting materials. At above about 300° C. decomposition may occur depending on the nature of the starting phenol. When the reaction mixture contains large amounts of an aldehyde with small amounts of alcohol higher temperatures are ordinarily required even though some dealkylation and/or decomposition may result. The deleterious effect of operating at higher temperatures can be offset somewhat by the use of a suitable catalyst such as copper, copper chromite or other hydrogenation-dehydrogenation catalyst. In general, it is found that the use of such catalysts affords the greatest advantage when operating at the higher temperatures. The nature of the reactants will also influence the temperature at which the reaction is conducted but the preferred temperature of 200° C. to 275° C. is suitable in most instances. In general lower temperatures may be employed where the starting phenol is alkylated with tertiary alkyl groups whereas higher temperatures may be required with phenol or alkylated phenols having primary or secondary alkyl radicals. Higher temperatures are also required with an increasing number of carbon atoms in the aldehyde and/or alcohol. In all cases, however, the minimum temperature of reaction is 150° C.

The reaction is preferably conducted at pressures higher than atmospheric. In the preferred embodiment the reaction is conducted at autogenic pressures as such pressures are most easily employed but, if desired, the pressures may be higher than autogenic.

The time for the reaction to be completed will vary depending upon such factors as the temperatures, the nature and quantity of the reactants, pressures, and the like. In general it will be found that the reaction time will range from about 1 to about 4 hours. With the preferred reactants and temperatures in the order of about 200-250° C. the reaction is substantially complete after about one hour or less and no substantial advantage accrues from conducting the reaction for longer periods of time. In other cases, however, longer reaction times may be required for higher yields where, for example, the reaction mixture involves an aldehyde having more than 3 carbon atoms.

The quantity of the several reactants may be varied within wide limits in order to obtain satisfactory yields. Thus, the alcohol may be present in amounts ranging from about 5 to about 25 moles of the phenol but it is preferred that the alcohol be present in amounts from about 10 to 20 moles of the phenol. The preferred amounts afford sufficient alcohol for maximum conversion with a convenient excess. If desired greater excesses may be employed but care should be taken to avoid a problem of handling the excess.

The quantity of the aldehyde may also be varied within wide limits and may be based on the amount of alcohol present and may range from 0.005 to 1.0 mole per mole of alcohol. As the alcohol may be present in any desired excess, it is more convenient to base the aldehyde on the starting phenol in which case it may range from .05 to 2.0 moles with .5 to 1.5 moles being preferred.

The basic acting material should be present in amounts ranging from about 0.05 to 3 moles of the phenol in order to obtain suitable conversions. In the preferred embodiment the amount of the basic acting material will range from about .5 to 1 mole based on the starting phenol. Greater or lesser amounts may be employed but, as previously indicated, with lesser amounts the yield of the desired product will be lower.

It is a particularly outstanding advantage of the present invention that the processes may be conducted easily with readily available apparatus and equipment. Further, because of the simplicity of the present process continuous, intermittent or batch-type operations may be employed for the practice of the present invention. It is a further advantage that the separation and purification steps required in order to isolate the desired products are simply and efficiently conducted. The processes of this invention, together with various modifications and embodiments, are described in the following examples. It should be understood however, that the examples are merely illustrative of the invention as defined in the claims and the examples are in no way intended as limitations thereto.

*Example 1*

Into a pressure vessel, containing a piece of copper screen about 6" x 8", are charged the following:

2,6-di-tert-butyl phenol 103 g.; 0.5 mole
Formaldehyde 11 g.; 0.375 mole
Sodium hydroxide 30 g.; 0.75 mole
Methanol 240 g.; 7.5 mole The sodium hydroxide is dissolved in the methanol before charging it to the reaction vessel. The temperature is then raised over a period of about one hour to 225° C. and the temperature is maintained for about one hour. After cooling, the reaction product is transferred to a suitable vessel and the methanol is removed by distillation. About 100 ccs. of water is added to dissolve sodium salts which may have formed. The product, 2,6-di-tert-butyl p-cresol, is extracted with ether after which the ether layer is distilled. The residue is distilled at 90–105° C. and 1 mm. Hg yielding 86 grams of 2,6-di-tert-butyl p-cresol of more than 97% purity which amounts to about a 78% conversion. There is also obtained 14 grams of a higher boiling fraction (B. P. 180–220° C. at 1 mm. Hg) which contains about 16% of methylene bis(2,6-di-tert-butyl phenol) and an unidentified residue of 7.5 grams. Unreacted 2,6-di-tert-butyl phenol is present in an amount less than 1%.

*Example II*

Substantially the same procedure as in Example I is repeated except that copper is not present during the reaction and the sodium hydroxide and methanol are not premixed. Further, the reaction is conducted for four hours. Substantially the same results are obtained except that the by-product distribution showed about 1% more of the bisphenol.

*Example III*

The procedure of Example I is repeated except that the sodium hydroxide is added as a 50% aqueous solution and the reaction is conducted for 2 hours. The alkylated product is obtained in about 73% yield and about 10% of the bisphenol is present in the reaction product.

*Example IV*

The procedure of Example I is repeated except that the reaction is conducted at about 200° C. There is obtained 74% of the desired alkylated product with the by-product containing about 6% of the bisphenol and less than 1% of unreacted 2,6-di-tert-butyl phenol. By increasing the reaction time the yield of 2,6-di-tert-butyl p-cresol is increased at the expense of other by-products.

*Example V*

The procedure of Example II is repeated except that the reaction is conducted at 2 hours at 175° C. There is obtained 30% of the para-alkylated phenol and a by-product comprising about 34% of the bisphenol. At temperatures in the order of 150° C. substantially lesser amounts of the desired para-alkylated products are obtained.

*Example VI*

To a reaction vessel as in Example I are charged 0.2 mole of 2,6-di-tert-butyl phenol, 0.3 mole of sodium hydroxide and 3.12 moles of methanol. The reaction is conducted at 250° C. for 4 hours in the presence of a copper screen. There is obtained about 51% of 2,6-di-tert-butyl p-cresol. The by-product contains 15% of 2-tert-butyl p-cresol and 8% of 2-tert-butyl phenol. The production of these products is attributed to the formation of formaldehyde in situ. By varying the procedure as by adding formaldehyde, using shorter reaction times and/or increasing the amount of the methanol the yield of 2,6-di-tert-butyl p-cresol will be increased. In all cases debutylation will be found to occur at temperatures of about 300° C.

*Example VII*

The same procedure of Example III was repeated except that the sodium hydroxide is added as sodium methylate. Substantially the same results are obtained.

*Example VIII*

2,4,6-tri-tert-butyl phenol (.2 mole), formaldehyde (0.15 mole), methanol (3.0 moles) and sodium hydroxide (0.3 mole) are reacted for two hours at 225° C. Only starting material is recovered.

As previously indicated the process of this invention appears to be critically dependent upon the presence of a basic acting material. Several experiments are conducted in order to establish this fact.

*Example IX*

To a reaction vessel as in Example I is charged 0.5 mole of 2,6-di-tert-butyl phenol, 0.1 mole formaldehyde, 0.5 mole of sodium hydroxide, and 7.5 moles of methanol. The sodium hydroxide is dissolved in the methanol before being charged to the reaction vessel. Copper is not present during the course of the reaction which is conducted for 2 hours at 225° C. After extracting and separating the reaction product it is found that 2,6-di-tert-butyl p-cresol is present in about 17%, unreacted starting phenol amounts to about 23% and the bisphenol is present in about 41%. The remaining products are not identified.

*Example X*

The procedure of Example I is repeated except that 0.1 moles sodium hydroxide is present. The amount of 2,6-di-tert-butyl p-cresol obtained amounts to less than 15% and the amount of unreacted starting phenol is present in substantially greater amounts. In a companion experiment the procedure of Example I is repeated except that the sodium hydroxide is eliminated altogether. After 2 hours of reacting the presence of 2,6-di-tert-butyl p-cresol is not detected. When the reaction is conducted for 4 hours the presence of the desired product still is not observed.

The basic-acting material which must be present during the course of the reaction may be selected from others than sodium hydroxide as is illustrated in Examples XI–XIV.

*Example XI*

To a reaction vessel as in Example I is charged 0.2 mole of 2,6-di-tert-butyl phenol, 0.15 mole of formaldehyde, 0.3 mole of triethylamine and 3.15 moles of methanol. To the reaction vessel is added a piece of copper screen as in Example I. The reaction is conducted at 225° C. for 4 hours. After working-up the reaction product as in Example I there is obtained about 34% of 2,6-di-tert-butyl p-cresol, about 21% of unreacted starting phenol and about 4.5% of the bisphenol. There remains about 43% of an unidentified residue.

*Example XII*

The procedure of Example I is repeated except that a molar equivalent of ammonia replaces the sodium hydroxide. 2,6-di-tert-butyl p-cresol is obtained in lower amounts and the yield of unreacted starting material is somewhat higher.

*Example XIII*

The procedure of Example I is repeated using a molar equivalent of potassium hydroxide. Substantially the same results are obtained.

*Example XIV*

The procedure of Example I is repeated except that an equivalent amount of a saturated solution of potassium carbonate in water replaces the sodium hydroxide. The yields of the desired product is somewhat lower and the unreacted starting material is present in an amount somewhat higher than obtained using sodium hydroxide.

In related experiments other basic acting materials are used in the processes of this invention instead of the alkali metal hydroxide. Such basic acting materials include primary amines as ethyl amine and aniline; secondary amines as diethyl amine; quaternary ammonium salts as tetramethyl ammonium hydroxide and other basic acting materials such as sodium carbonate, calcium oxide, and the like. From the several experiments using various basic-acting materials the conclusion may be drawn that, in general, the alkali metal hydroxides are preferred as the basic-acting material for the reason that yields of the desired product are substantially higher.

Examples I through XIV all involve 2,6-di-tert-butyl phenol, formaldehyde and methanol as the starting materials. However, as previously indicated, other phenols, aldehydes and alcohols may be employed. The following examples are illustrative of applications of this invention using a variety of reactants.

*Example XV*

To a reaction vessel as in Example I is charged 0.25 mole of 2,6-di-tert-butyl phenol, 0.075 mole of acetaldehyde, 3.75 moles of methanol and 0.375 mole of sodium hydroxide. The reaction is conducted at 200° C. for 4 hours. After working-up the reaction product as in Example I there is obtained 39% conversion to 2,6-di-tert-butyl-p-cresol, 16% of 2,6-di-tert-butyl 4-ethylphenol and 37% of a higher boiling residue. Using the same procedure with reaction times of about 2 hours the yield of the alkylated phenolic products is substantially increased.

*Example XVI*

The procedure of Example I is repeated using 0.2 mole of the 2,6-di-tert-butyl phenol, 0.2 mole of acetaldehyde, 2.06 moles of ethanol and 0.3 mole of sodium hydroxide. There is obtained, after 4 hours at 225° C., 63% conversion of 2,6-di-tert-butyl-4-ethylphenol, 19% of unreacted starting material and 13% of a higher boiling residue.

*Example XVII*

The procedure of Example XVI is repeated except that 0.2 mole of 2,6-diisopropyl phenol, 0.15 mole of formaldehyde, 3 moles of methanol and .3 mole of sodium hydroxide is used. After reacting for 4 hours at 225° C. there is obtained 12% conversion to 2,6-diisopropyl-4-methylphenol. By increasing the reaction temperature the quantity of the product is substantially increased.

*Example XVIII*

Following the same general procedure, 0.2 mole of 2,6-xylenol, 0.15 mole of formaldehyde, 0.3 mole of methanol and 0.3 mole of sodium hydroxide are reacted at 265° C. for 4 hours. There is obtained a reaction mixture comprising 67% mesitol, 10% unreacted 2,6-xylenol, 16% of the corresponding bisphenol and the remainder being a residue.

*Example XIX*

A reaction mixture comprising 0.5 mole of phenol, 0.5 mole of formaldehyde, 3.0 moles of methanol and 0.75 mole of sodium hydroxide are reacted at 290° C. for about 4 hours. Among the recovered reaction products there is 20% of a 1:1 mixture of ortho- and para-cresol.

*Example XX*

A reaction product comprising mainly a 2,4-dimethyl-6-tert-butyl phenol is obtained from the reaction of 2-tert-butyl phenol, formaldehyde and methanol in the presence of sodium hydroxide.

From the foregoing examples and description of the invention it will be readily appreciated that the processes of this invention are capable of a multitude of variations and modifications which have not been described by detailed examples. Numerous additional experiments, other than those described above, were conducted for the purpose of studying the effect of variations of conditions of reaction and the effect of using other reactants. It will be found that aldehydes having a greater number of carbon atoms may be employed but in those cases the yield of the desired product is substantially lower. If desired, paraformaldehyde or "Formcel," an alcoholic formaldehyde solution, may be employed instead of formalin. Inert solvents may be used with advantage particularly when the aldehyde and alcohol have a greater number of carbon atoms. In the light of the present disclosure still other modifications will become apparent to those skilled in the art.

We claim as our invention:

1. A process for the nuclear alkylation of a phenol having a hydrogen bonded to the aromatic nucleus in at least one of the positions ortho- and para- to the phenolic hydroxyl group, which comprises reacting said phenol with from about 0.05 to about 2 moles of a saturated aldehyde per mole of phenol, at temperatures between about 150° C. and about 350° C., the reaction being conducted in the presence of from about 0.05 to about 3 moles of a basic acting material per mole of phenol, in the presence of at least about 5 moles per mole of phenol of a primary alkanol having from 1 to 8 carbon atoms, and at a pressure sufficient to maintain the reactants in their liquid state.

2. The process of claim 1 in which the aldehyde has from 1 to 8 carbon atoms.

3. The process of claim 1 in which nuclear alkylation occurs in the position para- to the phenolic hydroxyl group.

4. The process of claim 1 in which the alcohol has from 1 to 8 carbon atoms.

5. The process of claim 1 in which the basic-acting material is an alkali metal hydroxide.

6. A process for the para-alkylation of a 2,6 dialkyl phenol, which comprises reacting said phenol with from about 0.05 to about 2 moles of a saturated aldehyde per mole of phenol, at temperatures between about 150° C. and about 350° C., said reaction being conducted in the presence of from about 0.05 to about 3 moles of a basic acting material per mole of phenol, in the presence of at least about 5 moles per mole of a phenol of a primary alkanol having from 1 to 8 carbon atoms, and at a pressure sufficient to maintain the reactants in their liquid state.

7. The process of claim 6 in which the aldehyde is formed in situ by reaction of a primary aliphatic alcohol in the presence of a copper catalyst.

8. The process of claim 6 in which the alcohol is methanol.

9. The process of claim 6 in which the phenol is 2,6-di-tert-butyl phenol.

10. A process for the para-alklation of 2,6-di-tert-butyl phenol, which comprises reacting said phenol with from about 0.05 to about 2 moles of a saturated aldehyde having from 1 to 3 carbon atoms, per mole of phenol, the reaction being conducted at temperatures between about 150° C. and 350° C., said reaction being further conducted in the presence of from about 0.05 to about 3 moles of a basic-acting material per mole of phenol, in the presence of a primary alkanol having from 1 to 3 carbon atoms, and at a pressure sufficient to maintain the reactants in their liquid state.

11. The process of claim 10 in which the aldehyde is formaldehyde.

12. The process of claim 10 in which the alcohol is methanol.

13. The process of claim 10 in which the basic acting material is an alkali metal hydroxide.

14. The process of claim 10 in which the reaction is conducted at autogenic pressure.

15. A process for the preparation of 2,6-di-tert-butyl p-cresol which comprises reacting 2,6-di-tert-butyl phenol with from about 0.02 to about 2 moles of formaldehyde per mole of phenol at temperatures ranging from about 175° C. to about 250° C. at autogenic pressures, said reaction being conducted in the presence of from about 0.05 to about 3 moles of an alkali metal hydroxide per mole of phenol, and in the presence of no less than 5 moles of methanol per mole of phenol.

16. A process for the nuclear alkylation of a phenol having a hydrogen bonded to the aromatic nucleus in at least one of the positions ortho- and para- to the phenolic hydroxyl group, which comprises reacting said phenol with a saturated aldehyde, at temperatures between about 150° and about 350° C., the reaction being conducted in the presence of from about 0.05 to about 3 moles of a basic acting material per mole of phenol, in the presence of at least about 5 moles per mole of phenol of a primary alkanol having from 1 to 8 carbon atoms, the amount of the saturated aldehyde being from 0.005 to 1.0 mole per mole of alkanol, and at a pressure sufficient to maintain the reactants in their liquid state.

References Cited in the file of this patent

UNITED STATES PATENTS

| | | |
|---|---|---|
| 2,488,134 | Mikeska et al. | Nov. 15, 1949 |
| 2,497,503 | Jones | Feb. 14, 1950 |
| 2,792,428 | Pikl | May 14, 1957 |
| 2,806,031 | Rigterink | Sept. 10, 1957 |
| 2,807,653 | Filbey et al. | Sept. 24, 1957 |